(12) United States Patent
Sadil et al.

(10) Patent No.: US 10,830,441 B2
(45) Date of Patent: Nov. 10, 2020

(54) SWIRLER FOR A TURBINE ENGINE COMBUSTOR

(71) Applicant: United Technologies Corporation, Farmington, CT (US)

(72) Inventors: Andreas Sadil, Newington, CT (US); Steven W. Trinks, Wallingford, CT (US); Jonathan M. Jause, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 370 days.

(21) Appl. No.: 15/025,685

(22) PCT Filed: Oct. 1, 2014

(86) PCT No.: PCT/US2014/058616
§ 371 (c)(1),
(2) Date: Mar. 30, 2016

(87) PCT Pub. No.: WO2015/050986
PCT Pub. Date: Apr. 9, 2015

(65) Prior Publication Data
US 2016/0231000 A1    Aug. 11, 2016

Related U.S. Application Data

(60) Provisional application No. 61/887,010, filed on Oct. 4, 2013.

(51) Int. Cl.
*F23R 3/28* (2006.01)
*F23R 3/14* (2006.01)
*F02C 7/236* (2006.01)

(52) U.S. Cl.
CPC ............ *F23R 3/286* (2013.01); *F02C 7/2365* (2013.01); *F23R 3/14* (2013.01); *F23R 2900/00018* (2013.01)

(58) Field of Classification Search
CPC .......... F23R 3/14; F23R 3/286; F02C 7/2365
See application file for complete search history.

(56) References Cited

U.S. PATENT DOCUMENTS 5,165,241 A * 11/1992 Joshi .................. F23R 3/14
60/737
5,274,995 A    1/1994 Horner et al.
(Continued)

FOREIGN PATENT DOCUMENTS

EP    2385307    11/2011

OTHER PUBLICATIONS

Extended EP Search Report dated Oct. 4, 2016.
EPO Official Letter dated Dec. 12, 2018 for EP Application No. 14851349.2.

*Primary Examiner* — Arun Goyal
(74) *Attorney, Agent, or Firm* — Getz Balich LLC

(57) ABSTRACT

A swirler is provided for a turbine engine. The swirler includes a swirler housing and a swirler nozzle that is attached to the housing. The housing defines a first inlet and a second inlet. The housing and the nozzle form an inner passage and an outer passage. The inner passage is radially within the nozzle and coupled with the first inlet. The outer passage is radially between the housing and the nozzle and coupled with the second inlet.

19 Claims, 5 Drawing Sheets

(56) References Cited

U.S. PATENT DOCUMENTS

| | | | |
|---|---|---|---|
| 6,070,411 A * | 6/2000 | Iwai | F23D 17/00 60/737 |
| 6,412,272 B1 | 7/2002 | Titterton et al. | |
| 6,925,809 B2 * | 8/2005 | Mowill | F23R 3/26 431/186 |
| 7,007,864 B2 | 3/2006 | Snyder et al. | |
| 7,093,441 B2 | 8/2006 | Burd et al. | |
| 7,334,410 B2 | 2/2008 | Creighton et al. | |
| 7,628,019 B2 | 12/2009 | Tanner et al. | |
| 8,291,688 B2 * | 10/2012 | Davis, Jr. | F23D 14/82 60/39.091 |
| 8,291,706 B2 | 10/2012 | Tanner et al. | |
| 8,312,724 B2 | 11/2012 | Dai et al. | |
| 8,347,630 B2 | 1/2013 | Lovett et al. | |
| 8,443,610 B2 | 5/2013 | Hoke et al. | |
| 8,479,521 B2 | 7/2013 | Hoke | |
| 9,513,010 B2 * | 12/2016 | Tseng | F02C 7/042 |
| 2004/0065090 A1 * | 4/2004 | Al-Roub | F23R 3/14 60/776 |
| 2005/0229600 A1 * | 10/2005 | Kastrup | F23R 3/14 60/748 |
| 2006/0207258 A1 | 9/2006 | Tanner et al. | |
| 2007/0119052 A1 * | 5/2007 | Caldwell | B23P 6/005 29/888.011 |
| 2009/0139237 A1 | 6/2009 | Sullivan et al. | |
| 2009/0159725 A1 | 6/2009 | Orociw et al. | |
| 2009/0255261 A1 * | 10/2009 | McMasters | B23P 6/007 60/737 |
| 2010/0300102 A1 | 12/2010 | Bathina et al. | |
| 2011/0048023 A1 | 3/2011 | Patel et al. | |
| 2012/0204571 A1 | 8/2012 | Kraemer et al. | |
| 2013/0145765 A1 | 6/2013 | Patel et al. | |

\* cited by examiner

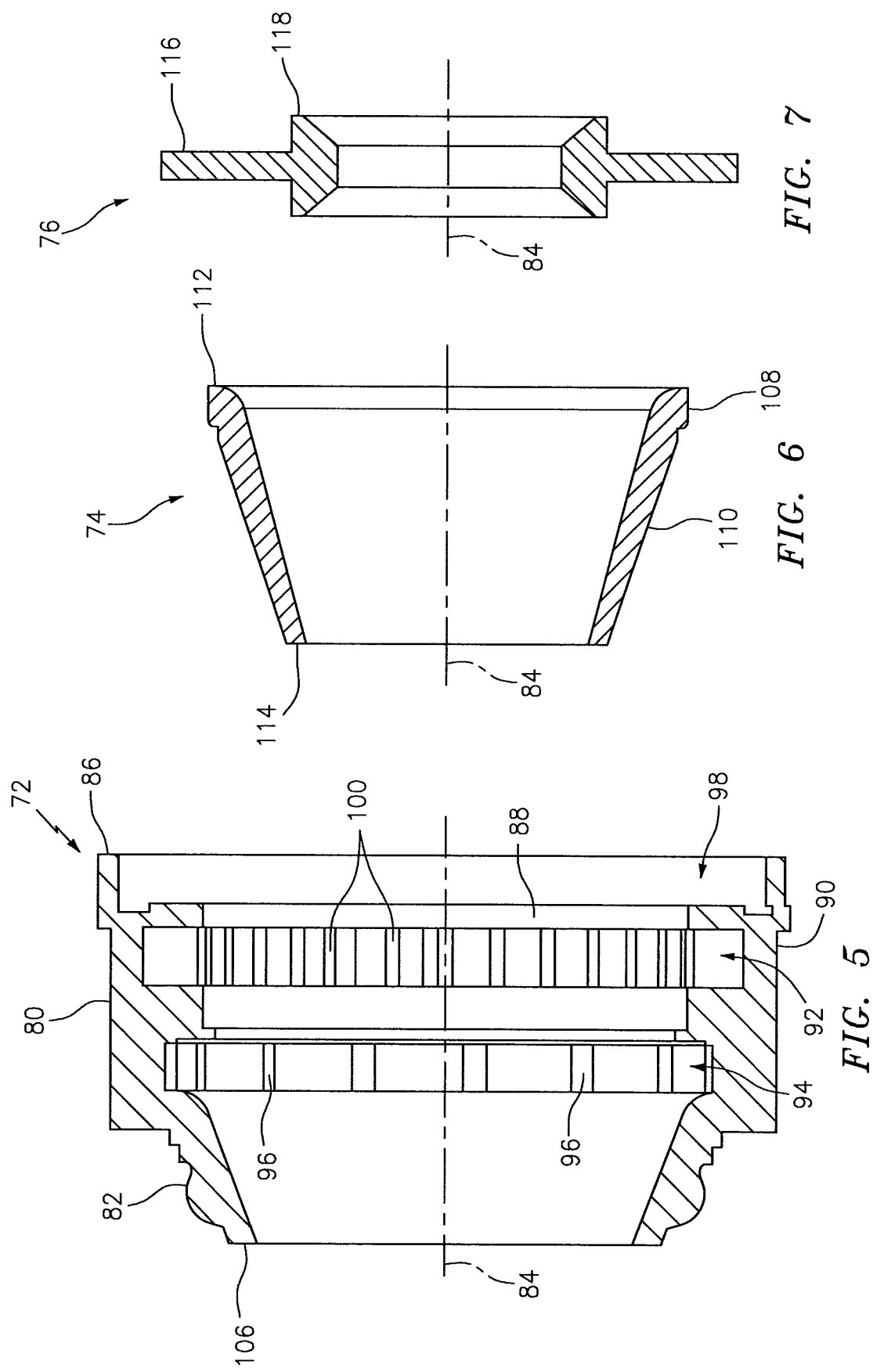

SWIRLER FOR A TURBINE ENGINE COMBUSTOR

CROSS-REFERENCE TO RELATED APPLICATIONS

This application claims priority to PCT Patent Application No. PCT/US14/058616 filed Oct. 1, 2014, which claims priority to U.S. Provisional Application Ser. No. 61/887,010 filed Oct. 4, 2013, which are hereby incorporated herein by reference in their entireties.

BACKGROUND OF THE INVENTION

1. Technical Field

This disclosure relates generally to a turbine engine and, more particularly, to a swirler for a turbine engine combustor.

2. Background Information

A turbine engine combustor typically includes a plurality of fuel injectors respectively mated with a plurality of swirlers. Each of the swirlers may be manufactured by brazing together a plurality of discrete swirler components. Brazing processes, however, can be time consuming and expensive.

There is a need in the art for an improved swirler.

SUMMARY OF THE DISCLOSURE

According to an aspect of the invention, a swirler is provided for a turbine engine. The swirler includes a swirler housing, which defines a first inlet and a second inlet. The swirler also includes a swirler nozzle attached to the housing. The housing and the nozzle form an inner passage and an outer passage. The inner passage is radially within the nozzle and coupled with the first inlet. The outer passage is radially between the housing and the nozzle and coupled with the second inlet.

According to another aspect of the invention, another swirler is provided for a turbine engine. The swirler includes a swirler housing and a swirler nozzle, which is radially within and attached to the housing. The housing and the nozzle form an inner passage and an annular outer passage. The inner passage is concentric with the outer passage and defined radially within the nozzle. The outer passage is defined radially between the housing and the nozzle.

According to another aspect of the invention, a fuel injector assembly is provided for a turbine engine. The assembly includes a fuel injector nozzle and a swirler, which is mounted to the fuel injector nozzle. The swirler includes a swirler housing and a swirler nozzle, which is attached to the swirler housing. An inner passage extends radially through the swirler housing, and is radially within the swirler nozzle. An outer passage extends radially through the swirler housing, and is radially between the swirler housing and the swirler nozzle.

The swirler housing may include a first inlet and a second inlet. The inner passage may be fluidly coupled with the first inlet. The outer passage may be fluidly coupled with the second inlet.

The inner passage may extend through the swirler from a first inlet in the swirler housing. The outer passage may extend through the swirler from a second inlet in the swirler housing.

The swirler nozzle may be mechanically attached to the swirler housing. The swirler nozzle, for example, may be press fit to the swirler housing.

The swirler housing may be configured as a unitary body.

The swirler housing may be configured from or otherwise include a first material. The swirler nozzle may be configured from or otherwise include a second material. This second material may be different than the first material. For example, the first material may be a metallic material and the second material may be a ceramic composite material. Alternatively, the second material may be the same as the first material.

The swirler nozzle may be radially within and concentric with the swirler housing.

The swirler housing may include one or more vanes arranged in the inner passage.

The swirler may include an annular nozzle guide that is connected to the swirler housing. The nozzle guide may be configured and adapted to mount the swirler housing to a fuel injector nozzle, which may extend axially into the inner passage.

The swirler may include an annular cover plate attached to swirler housing. The nozzle guide may be arranged within a notch of the swirler housing. The nozzle guide may be arranged axially between the swirler housing and the cover plate. The cover plate may be welded to the swirler housing.

The nozzle may be inserted within the housing. A tapered portion of the nozzle may be coaxial and/or axial aligned with a tapered portion of the housing.

The foregoing features and the operation of the invention will become more apparent in light of the following description and the accompanying drawings.

BRIEF DESCRIPTION OF THE DRAWINGS

FIG. 5 is a side sectional illustration of a swirler housing;

FIG. 6 is a side sectional illustration of a swirler nozzle; and

FIG. 7 is a side sectional illustration of a nozzle guide.

DETAILED DESCRIPTION OF THE INVENTION

Figure 1:
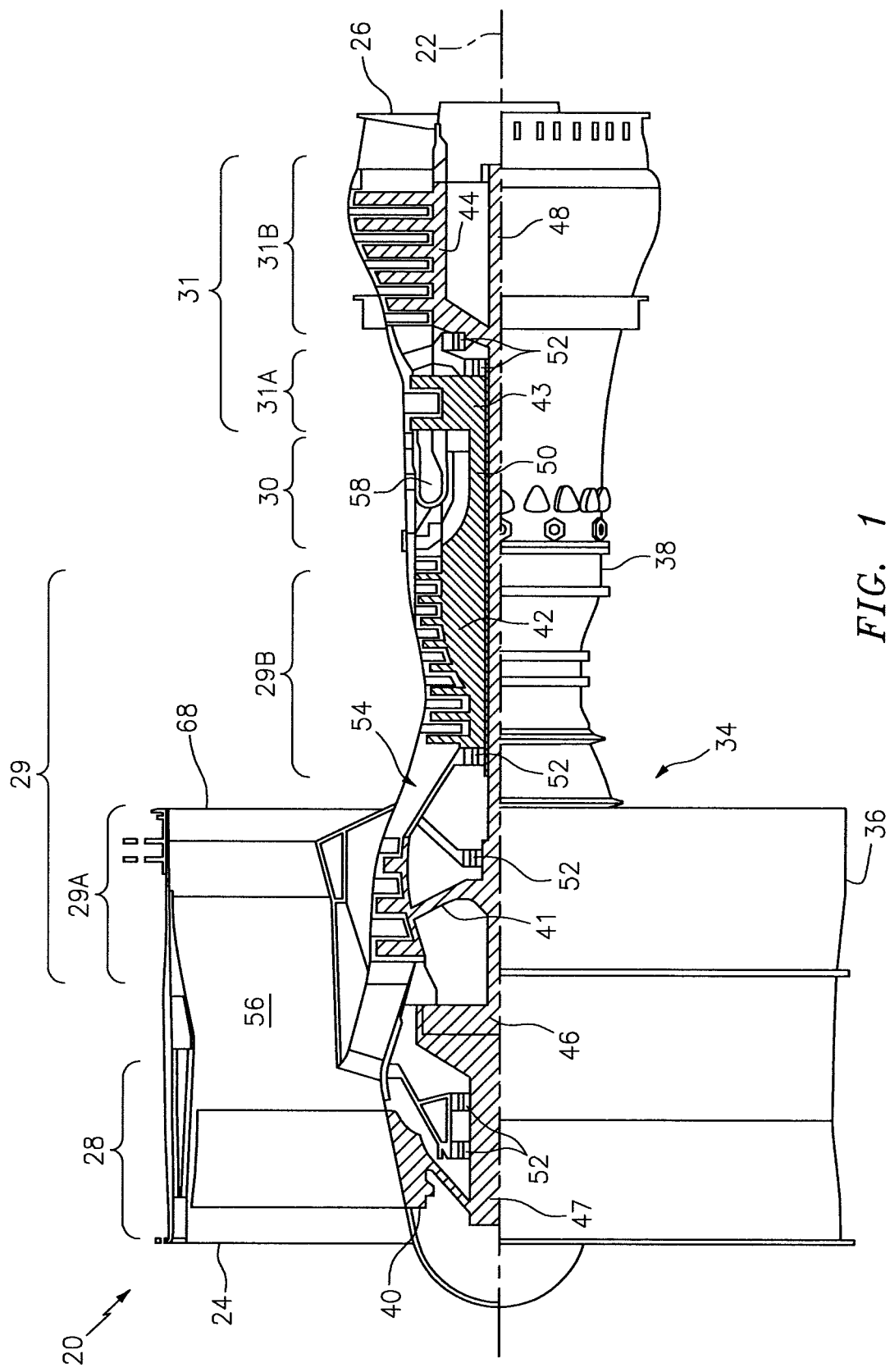
FIG. 1 is a side cutaway illustration of a geared turbine engine.

FIG. 1 is a side cutaway illustration of a geared turbine engine 20. The engine 20 extends along a centerline 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed, adhered or otherwise attached to) one or more respective rotor disks. The fan rotor 40 is connected to a gear train 46 through a shaft 47.

The gear train 46 and the LPC rotor 41 are connected to and driven by the LPT rotor 44 through a low speed shaft 48. The HPC rotor 42 is connected to and driven by the HPT rotor 43 through a high speed shaft 50. The shafts 47, 48 and 50 are rotatably supported by a plurality of bearings 52. Each of the bearings 52 is connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air".

Figure 2:
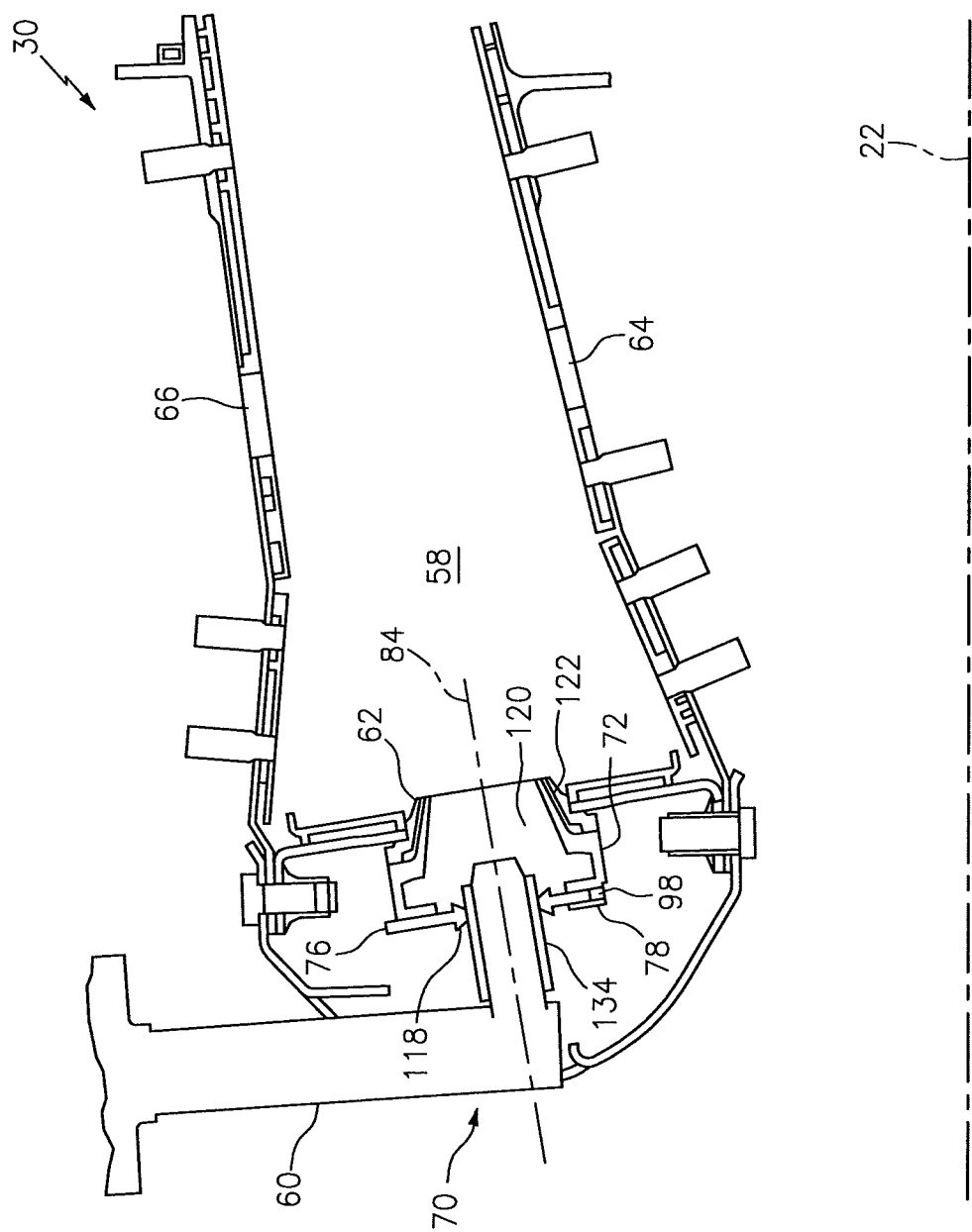
FIG. 2 is a side sectional illustration of a portion of a combustor section.

The core air is directed through the engine sections 29-31 and exits the engine 20 through the airflow exhaust 26. Referring to FIG. 2, within the combustor section 30, fuel is injected into an annular combustion chamber 58 by a plurality of circumferentially arranged fuel injectors 60. The injected fuel is mixed with swirled and/or turbulent core air provided by a plurality of swirlers 62. This fuel-core air mixture is ignited, quenched with additional core air provided by a plurality of circumferentially arranged quench apertures 64 and 66, and combusted to power the engine 20 and provide forward engine thrust.

Referring to FIG. 1, the bypass air is directed through the bypass gas path 56 and out of the engine 20 through a bypass nozzle 68 to provide additional forward engine thrust. Alternatively, the bypass air may be directed out of the engine 20 through a thrust reverser to provide reverse engine thrust.

Figure 3:
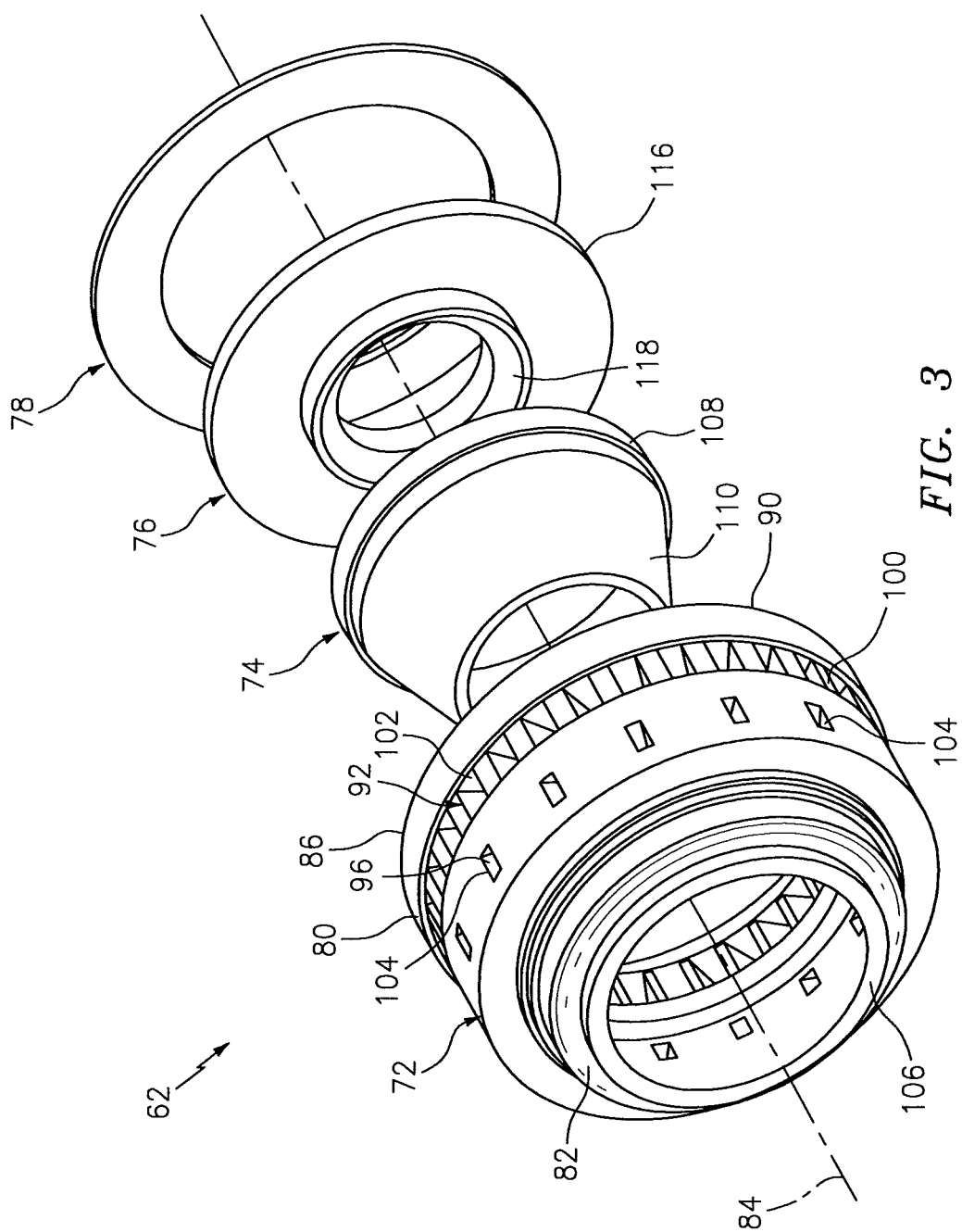
FIG. 3 is an exploded perspective illustration of a swirler.
Figure 4:
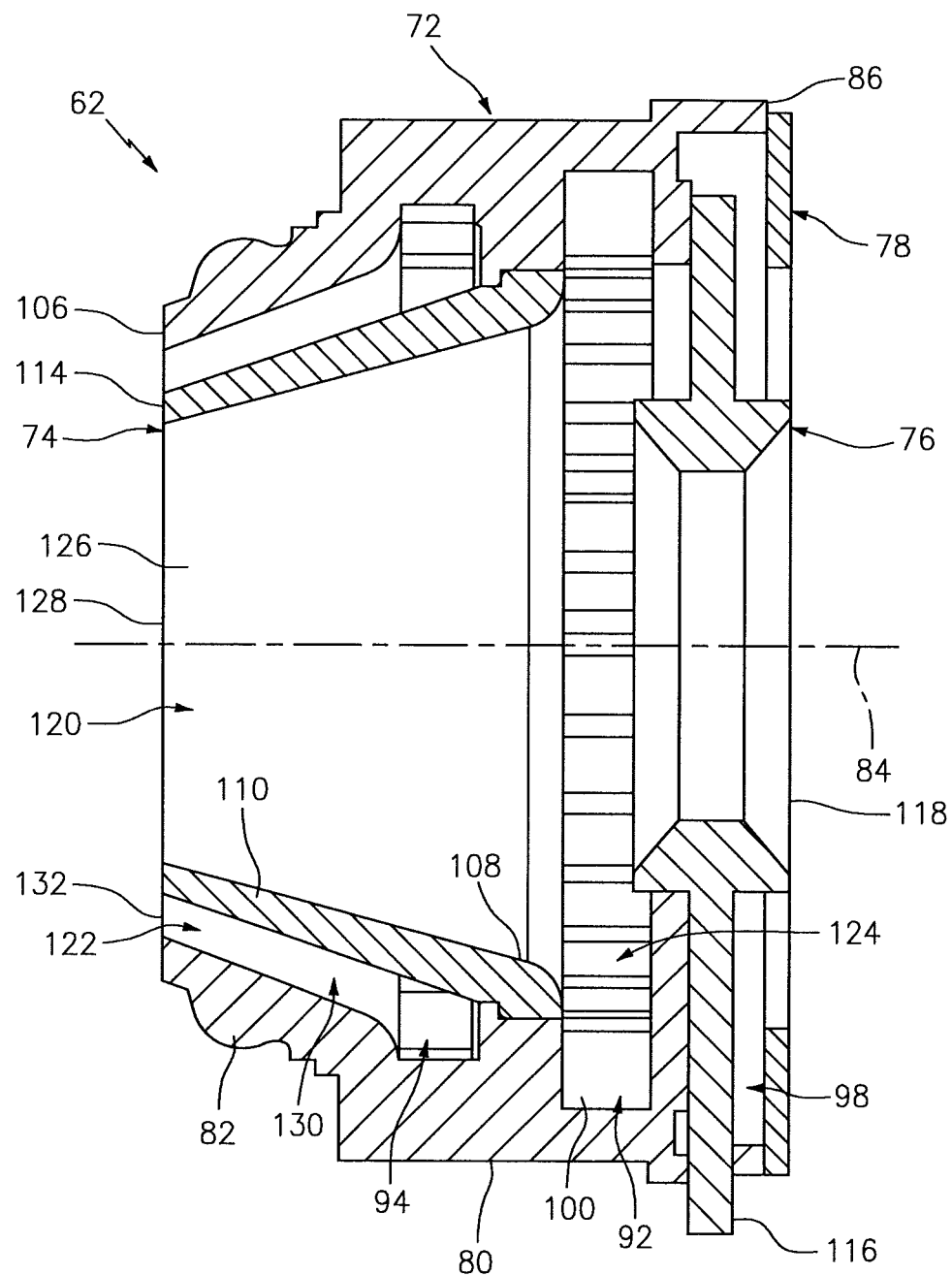
FIG. 4 is a side sectional illustration of the swirler.

FIG. 2 illustrates one of a plurality of fuel injector assemblies 70 included in the combustor section 30. Each fuel injector assembly 70 includes one of the fuel injectors 60 and a respective one of the swirlers 62. Referring to FIGS. 3 and 4, each of the swirlers 62 includes a swirler housing 72, a swirler nozzle 74, a fuel nozzle guide 76, and a cover plate 78.

Referring to FIGS. 3 and 5, the housing 72 includes a tubular base portion 80 and a generally tapered tubular nozzle portion 82. The base portion 80 extends along a swirler axis 84 from an upstream end 86 of the housing 72 to the nozzle portion 82. The base portion 80 extends radially between an inner side 88 and an outer side 90.

The base portion 80 includes a first channel 92 (e.g., an annular channel), a second channel 94 (e.g., an annular channel), one or more flow apertures 96, a notch 98 (e.g., an annular notch), and a set of vanes 100 (see FIGS. 3, 5). The first channel 92 is arranged axially between the second channel 94 and the notch 98. The first channel 92 extends radially through the base portion 80 from a first inlet 102 in the outer side 90 to the inner side 88. The second channel 94 is arranged axially between the first channel 92 and the nozzle portion 82 of the housing 72. The second channel 94 extends radially into the base portion 80 from the inner side 88. The flow apertures 96 are arranged circumferentially around the axis 84. The flow apertures 96 extend radially into the housing 72 from respective second inlets 104 in the outer side 90 to the second channel 94. The notch 98 extends axially into the base portion 80 from the housing upstream end 86. The notch 98 extends radially into the base portion 80 from the inner side 88.

The vanes 100 are arranged circumferentially around the axis 84 within the first channel 92 at, for example, the first inlet 102. Each of the vanes 100 may be configured to swirl core air in a clockwise or counter-clockwise direction around the axis 84 (when looking downstream). Similarly, each of the flow apertures 96 may also or alternatively be configured to swirl core air in a clockwise or counter-clockwise direction.

The nozzle portion 82 extends axially from the base portion 80 to a downstream end 106 of the housing 72. The nozzle portion 82 radially tapers as it extends towards the housing downstream end 106.

The housing 72 may be cast, forged, milled, machined, additive manufactured and/or otherwise formed having a unitary body. The term "unitary body" may be used to describe a body configured from a continuous mass of material. Examples of a unitary body include, but are not limited to, a cast body or a body milled, machined and/or forged from a billet of material. In contrast, a non-unitary body may be formed from a plurality of discrete bodies that are joined (e.g., welded) together to form a single part.

The housing 72 may be formed from metallic material. Examples of metallic materials include, but are not limited to, nickel alloy, cobalt alloy and stainless steel. Of course, the housing 72 may alternatively be formed from materials, metallic and/or non-metallic, other than those described above.

Referring to FIGS. 3 and 6, the nozzle 74 includes a mounting portion 108 and a nozzle portion 110. The mounting portion 108 is configured as an annular ring, and extends along the axis 84 from an upstream end 112 to the nozzle portion 110. The nozzle portion 110 extends along the axis 84 from the mounting portion 108 to a downstream end 114. The nozzle portion 110 radially tapers as it extends axially towards the downstream end 114.

The nozzle 74 may be cast, forged, milled, machined, additive manufactured and/or otherwise formed having a unitary body. The material from which the nozzle 74 is formed may be the same or different than the material from which the housing 72 is formed. The nozzle 74, for example, may be formed from metallic material. Examples of metallic materials include, but are not limited to, nickel alloy, cobalt alloy and stainless steel. Alternatively, the nozzle 74 may be formed from non-metallic material such as, for example, ceramic composite material. Examples of ceramic composite materials include, but are not limited to, a monolithic ceramic (e.g., silicon nitride) and a ceramic matrix composite (e.g., silicon carbide, alumina or mullite). Of course, the nozzle 74 may alternatively be formed from materials, metallic and/or non-metallic, other than those described above.

Referring to FIGS. 3 and 7, the nozzle guide 76 may be configured generally as an annular plate. The nozzle guide 76 includes a retainer portion 116 that is connected to a bushing portion 118. The retainer portion 116 extends radially out from the bushing portion 118. The nozzle guide 76 may be cast, forged, milled, machined, additive manufactured and/or otherwise formed having a unitary body. The material from which the nozzle guide 76 is formed may be the same or different than the material from which the housing 72 is formed. Of course, the nozzle guide 76 may alternatively be formed from materials, metallic and/or non-metallic, other than those described above.

Referring to FIGS. 3 and 4, the cover plate 78 may be configured as an annular plate. The cover plate 78 may be cast, forged, milled, machined, additive manufactured and/or otherwise formed having a unitary body. The material from which the cover plate 78 is formed may be the same or different than the material from which the housing 72 is formed. Of course, the cover plate 78 may alternatively be formed from materials, metallic and/or non-metallic, other than those described above.

Referring to FIG. 4, the nozzle 74 is inserted within the housing 72 and is concentric with the housing 72. The mounting portion 108 is attached to the base portion 80. The mounting portion 108, for example, may be is mechanically attached (e.g., press fit) to a portion of the housing 72 located axially between the first and the second channels 92 and 94. By press fitting the mounting portion 108 to the housing 72, use of expensive bonding processes such as brazing processes may be eliminated (or reduced) from the swirler manufacturing process. The present invention, however, is not limited to any particular method of attaching the nozzle 74 to the housing 72. In some embodiments, for example, the mounting portion 108 may be attached to the housing 72 by a butt weld or a fillet weld. The mounting portion 108 may be detachably or permanently engaged with the housing 72.

The housing 72 and the nozzle 74 form two concentric airflow passages: an inner passage 120 and an outer passage 122. The inner passage 120 is formed by the first channel 92, an intermediate chamber 124 and a bore 126 of the nozzle 74. The inner passage 120 extends radially through the base portion 80 from the first inlet 102 to the intermediate chamber 124. The inner passage 120 extends axially through the nozzle 74 from the intermediate chamber 124 to a first outlet 128. This first outlet 128 is defined by the nozzle portion 110 at the downstream end 114. In this manner, the inner passage 120 extends through the swirler 62 between and is fluidly coupled with the first inlet 102 and the first outlet 128.

Referring to FIGS. 3 and 4, the outer passage 122 is formed by the flow apertures 96, the second channel 94 and an annulus 130, which extends radially between the nozzle portions 82 and 110. The outer passage 122 extends radially through the base portion 80 from the second inlets 104 to the annulus 130. The outer passage 122 extends axially, between the housing 72 and the nozzle 74, to a second outlet 132. This second outlet 132 is defined radially between the nozzle portions 82 and 100 at the downstream ends 106 and 114. In this manner, the outer passage 122 extends through the swirler 62 between and is fluidly coupled with the second inlets 104 and the second outlet 132.

The retainer portion 116 is arranged within the notch 98 (see FIG. 4). The cover plate 78 is attached to the housing 72, which connects the nozzle guide 76 to the housing 72. The cover plate 78, for example, may be welded or otherwise bonded or attached to the base portion 80 at the housing downstream end 86.

Referring to FIG. 2, the swirler 62 is mounted to the fuel injector 60. A fuel injector nozzle 134 of the fuel injector 60 extends into the inner passage 120. The bushing portion 118 of the nozzle guide 76 is mated with the fuel injector nozzle 134. This configuration enables the swirler 62 to generally float relative to the fuel injector 60 during engine 20 operation. For example, the fuel injector nozzle 134 may slide along the axis 84 within the bushing portion 118. The retainer portion 116 may move radially within the notch 98.

In some embodiments, the swirler 62 may include one or more additional inlets. One or more of these inlets may each be fluidly coupled with the inner and/or outer passages 120 and 122. One or more of the inlets may also or alternatively each be fluidly coupled with one or more additional passages through the swirler 62.

The terms "inner" and "outer" are used to orientate the components of the fuel injector assemblies 70 described above relative to the turbine engine and its axis. A person of skill in the art will recognize, however, one or more of these components may be utilized in other orientations than those described above. The present invention therefore is not limited to any particular spatial orientations.

The fuel injector assemblies 70 may be included in various turbine engines other than the one described above. The fuel injector assemblies 70, for example, may be included in a geared turbine engine where a gear train connects one or more shafts to one or more rotors in a fan section, a compressor section and/or any other engine section. Alternatively, the fuel injector assemblies 70 may be included in a turbine engine configured without a gear train. The fuel injector assemblies 70 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly method, comprising:
providing a swirler housing configured with a first inlet for a first set of swirler vanes and a second inlet for a second set of swirler vanes;
providing a swirler nozzle that is a discrete body from the swirler housing;
nesting the swirler nozzle with the swirler housing, wherein the nesting comprises inserting a distal downstream end of the swirler nozzle into an opening at a distal upstream end of the swirler housing, wherein the swirler housing extends along an axial centerline from the distal upstream end of the swirler housing to a distal downstream end of the swirler housing, wherein the distal downstream end of the swirler nozzle is an axially downstream-most end of the swirler nozzle along the axial centerline, and wherein the distal upstream end of the swirler housing is an axially upstream-most end of the swirler housing along the axial centerline; and
attaching the swirler nozzle to the swirler housing;
wherein, after the swirler nozzle is attached to the swirler housing, the swirler housing and the swirler nozzle form an inner passage and an outer passage, the inner passage is radially within the swirler nozzle and is fluidly coupled with the first inlet, the outer passage is radially between the swirler housing and the swirler nozzle, and the outer passage is fluidly coupled with the second inlet.

2. The assembly method of claim 1, wherein the outer passage is defined by a surface of the swirler housing and a surface of the swirler nozzle that is radially opposed to the surface of the swirler housing.

3. The assembly method of claim 1, wherein the swirler nozzle is configured as a unitary body.

4. The assembly method of claim 1, wherein the swirler housing comprises a first material and the swirler nozzle comprises a second material that is different than the first material.

5. The assembly method of claim 4, wherein the second material comprises a ceramic composite material.

6. The assembly method of claim 1, wherein the swirler nozzle is radially within and concentric with the swirler housing.

7. The assembly method of claim 1, further comprising: providing an annular nozzle guide; and
connecting the annular nozzle guide to the swirler housing;
wherein the annular nozzle guide is configured to mount the swirler housing to a fuel injector nozzle that extends axially into the inner passage.

8. The assembly method of claim 7, further comprising mounting the swirler housing to the fuel injector nozzle via the annular nozzle guide.

9. The assembly method of claim 7, further comprising: providing an annular cover plate; and
attaching the annular cover plate to the swirler housing;
wherein the nozzle guide is arranged within a notch of the swirler housing, and axially between the swirler housing and the annular cover plate.

10. The assembly method of claim 9, wherein the annular cover plate is welded to the swirler housing.

11. The assembly method of claim 1, wherein
the swirler nozzle is within the swirler housing; and
a tapered portion of the swirler nozzle is coaxial and axially aligned with a tapered portion of the swirler housing.

12. The assembly method of claim 1, wherein the swirler nozzle comprises an inner surface that forms an outer peripheral boundary of the inner passage; and the inner surface tapers radially inward towards the axial centerline as the inner surface extends axially along the centerline to the axially downstream-most end of the swirler nozzle.

13. The assembly method of claim 1, wherein the first inlet is located axially between the distal upstream end of the swirler housing and the second inlet along the axial centerline.

14. The assembly method of claim 13, wherein the outer passage extends along the axial centerline to the distal downstream end of the swirler housing.

15. The assembly method of claim 1, wherein the first inlet is located axially between the opening and the second inlet along the axial centerline.

16. The assembly method of claim 1, wherein the swirler housing is configured as a unitary body.

17. The assembly method of claim 1, wherein the attaching comprises press fitting a mounting portion of the swirler nozzle into the swirler housing.

18. The assembly method of claim 1, wherein the attaching comprises welding the swirler nozzle to the swirler housing.

19. The assembly method of claim 1, wherein
the swirler housing includes an outer surface that extends circumferentially around the axial centerline; and
the first inlet and the second inlet are formed in the outer surface.

* * * * *